US008323153B2

(12) United States Patent
Deblack et al.

(10) Patent No.: US 8,323,153 B2
(45) Date of Patent: Dec. 4, 2012

(54) INTERLOCK CIRCUIT FOR UTILITY VEHICLE PARK BRAKE

(75) Inventors: Darren D. Deblack, Oconomowoc, WI (US); Stephan R. Hayden, Sun Prairie, WI (US)

(73) Assignee: Deere & Company, Moline, IL (US)

( * ) Notice: Subject to any disclaimer, the term of this patent is extended or adjusted under 35 U.S.C. 154(b) by 428 days.

(21) Appl. No.: 12/761,524

(22) Filed: Apr. 16, 2010

(65) Prior Publication Data

US 2011/0256982 A1 Oct. 20, 2011

(51) Int. Cl.
*F02D 9/06* (2006.01)

(52) U.S. Cl. ........................................................ 477/204

(58) Field of Classification Search .................. 477/204
See application file for complete search history.

(56) References Cited

U.S. PATENT DOCUMENTS 3,830,330 A * 8/1974 Fontaine ...................... 180/273
3,912,056 A 10/1975 Neal
3,942,604 A 3/1976 Black III
4,033,311 A 7/1977 Burson
4,051,915 A 10/1977 Behrens
4,173,961 A 11/1979 Howard
4,294,327 A 10/1981 Howard
4,295,540 A 10/1981 Hildebrecht
4,369,745 A 1/1983 Howard
4,501,256 A 2/1985 Dykstra
4,635,767 A 1/1987 Crane
4,974,711 A 12/1990 Peterson, Jr. et al.
5,101,802 A 4/1992 Reinhard
5,172,675 A 12/1992 Kurosu et al.
5,190,019 A 3/1993 Harvey
5,526,785 A 6/1996 Masters
5,593,367 A 1/1997 Eavenson, Sr. et al.
5,624,352 A 4/1997 Smale
6,293,363 B1 9/2001 Rangaswamy et al.
6,886,677 B2 5/2005 Rupiper et al.
7,224,088 B2 5/2007 Shoemaker et al.
7,451,865 B2 11/2008 Eavenson, Sr. et al.
7,523,796 B2 4/2009 Onderko et al.
2003/0139253 A1* 7/2003 Gruden .......................... 477/96

* cited by examiner

*Primary Examiner* — Edwin A Young

(57) ABSTRACT

An interlock circuit for a utility vehicle park brake includes a relay connected to neutral switch on a transmission. The relay is actuated by electric current to move a contact to a closed position if the neutral switch is out of neutral. A throttle pedal switch connected to the relay moves a contact to a closed position if the throttle pedal is depressed. A park brake switch connected to the throttle pedal switch moves a contact to a closed position if the park brake is engaged. Closing all of the contacts grounds an ignition circuit connected to the interlock circuit, which may be a magneto ignition circuit.

8 Claims, 1 Drawing Sheet

12 Vdc
100
107
168
157
158
160
162
166
170
164
156
154
108
101
110
102
120
124
122
142
140
144
148
150
152
112
114
123
128
136
104
138
146
106
OFF
ON

12 Vdc
100
107
168
157
158
160
162
166
170
164
156
154
108
101
110
102
120
124
122
142
140
144
148
150
152
112
114
123
128
136
104
138
146
106
OFF
ON

12 Vdc
100
107
168
157
158
160
162
166
170
164
156
154
108
101
110
102
120
124
122
142
140
144
148
150
152
112
114
123
128
136
104
138
146
106
OFF
ON

INTERLOCK CIRCUIT FOR UTILITY VEHICLE PARK BRAKE

FIELD OF THE INVENTION

This invention relates generally to a utility vehicle park brake, and specifically to an interlock circuit to disable a utility vehicle magneto ignition circuit if the park brake is engaged.

BACKGROUND OF THE INVENTION

In the past, mechanical interlocks have been provided for off-road utility vehicle park brakes to link together the park brake and throttle pedal. For example, U.S. Pat. No. 3,912,056 relates to a mechanical interlock activated by the park brake to restrict the operator's ability to apply the throttle pedal. Fuel supply interlocks also have been proposed for use with park brake systems to disable the fuel supply if the park brake is applied. For example, U.S. Pat. No. 4,295,540 relates to a vehicle brake and engine interlock that suppresses power output at the engine if the park brake is engaged, such as by adjusting the throttle valve of a carburetor to stall or shut down the engine.

Other interlocks for park brake systems have been designed to prevent engagement or maintain or establish a neutral condition of a vehicle transmission while the park brake is engaged. For example, U.S. Pat. No. 4,051,915 relates to neutral start and park brake safety interlock circuitry that stops current to the ignition coil if the transmission is engaged in forward or reverse while the park brake is also engaged. U.S. Pat. No. 6,886,677 relates to a mechanism that locks the forward and reverse pedals in a neutral position while the park brake is engaged. U.S. Pat. No. 6,279,937 relates to a neutral return mechanism that will place the transmission in neutral while the park brake is applied.

Some park brake systems require an electronic engine controller having internal logic to limit the engine rpm while the park brake is engaged. However, an engine controller may be too costly for a utility vehicle park brake.

An interlock circuit is needed for a utility vehicle park brake that is low in cost and complexity. An interlock circuit is needed for a utility vehicle park brake that prevents vehicle travel without shutting down the engine. An interlock circuit is needed for a utility vehicle park brake that prevents vehicle travel while allowing the operator to shift the transmission into forward or reverse. An interlock circuit is needed for a utility vehicle park brake that is not subject to wear of mechanical parts.

SUMMARY OF THE INVENTION

An interlock circuit for a utility vehicle park brake includes a normally open neutral switch moving to a closed position if a transmission of the utility vehicle is in neutral, a park brake interlock relay connected to the neutral switch and moving to a closed position if the neutral switch is open, a normally open throttle pedal switch connected to the park brake interlock relay and moving to a closed position if a throttle pedal is depressed, and a normally open park brake switch connected to the throttle pedal switch and moving to a closed position if the park brake is engaged. The park brake switch may be connected to a magneto ignition circuit to provide a high voltage to a spark plug. If the park brake switch, throttle pedal switch and park brake interlock relay are all closed, the magneto ignition circuit is grounded.

The interlock circuit is low in cost and complexity, prevents vehicle travel without shutting down the engine, and allows the operator to shift the transmission into forward or reverse. The interlock circuit also is not subject to wear of mechanical parts.

DESCRIPTION OF THE PREFERRED EMBODIMENT

Figure 1:
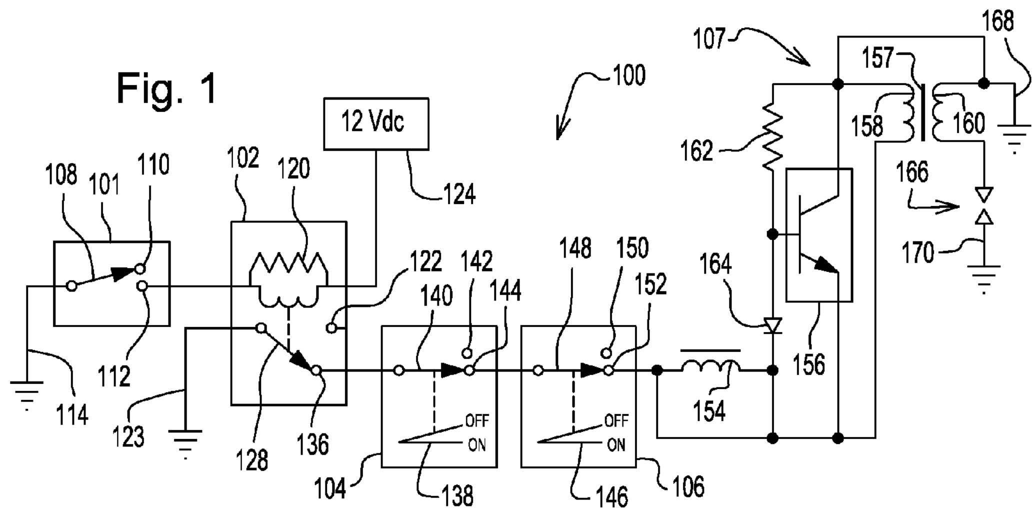
FIG. 1 is a schematic diagram of an interlock circuit for a utility vehicle park brake according to a first embodiment of the invention, with the transmission out of neutral, the throttle pedal depressed, and the park brake engaged.
Figure 2:
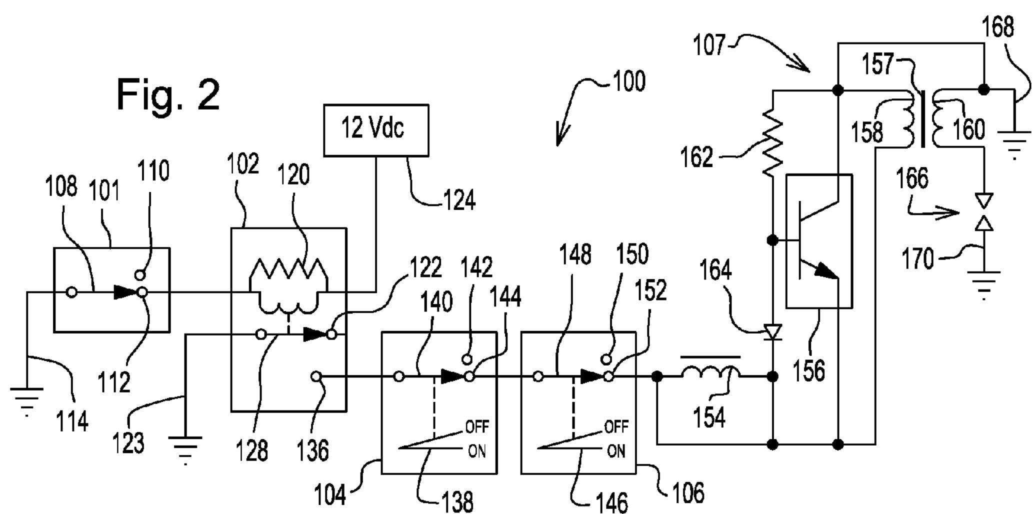
FIG. 2 is a schematic diagram of an interlock circuit for a utility vehicle park brake according to a first embodiment of the invention, with the transmission in neutral, the throttle pedal depressed, and the park brake engaged.
Figure 3:
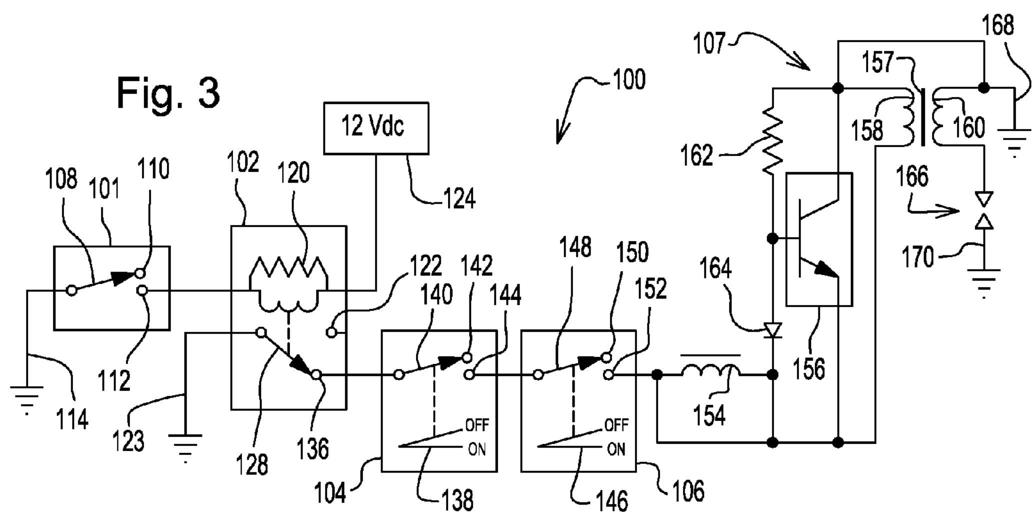
FIG. 3 is a schematic diagram of an interlock circuit for a utility vehicle park brake according to a first embodiment of the invention, with the transmission out of neutral, the throttle pedal released, and the park brake disengaged.

In a first embodiment of the invention shown in FIGS. 1-3, interlock circuit 100 is provided for a utility vehicle park brake. The interlock circuit may include neutral switch 101, park brake interlock relay 102, throttle pedal switch 104, and park brake switch 106. The interlock circuit may be connected to magneto ignition circuit 107.

In one embodiment, neutral switch 101 may be a normally open switch that closes if the utility vehicle transmission is in neutral. In FIGS. 1 and 3, the transmission is in forward or reverse and neutral switch contact 108 is in the normally open position touching upper contact 110. In FIG. 2, the transmission is in neutral and neutral switch contact 108 is in the closed position touching lower contact 112 and connecting it to ground 114.

In one embodiment, park brake interlock relay 102 may be a normally open relay switch actuated by coil 120 connected between lower contact 112 of neutral switch 101 and 12Vdc battery 124. If the transmission is in forward or reverse, as shown in FIGS. 1 and 3, neutral switch contact 108 is in the normally open position and relay contact 128 is in the closed position touching lower contact 136 and connecting it to ground 123. If the transmission is in neutral, as shown in FIG. 2, neutral switch contact 108 is in the closed position and electric current from the battery through the coil results in a magnetic field that moves relay contact 128 to the open position touching upper contact 122.

In one embodiment, throttle pedal switch 104 may be a normally open switch actuated by depressing throttle pedal 138. Throttle pedal switch contact 140 may be connected to lower contact 136 of the park brake interlock relay. In FIG. 3, throttle pedal 148 is released and throttle pedal switch contact 140 is in the normally open position touching upper contact 142. In FIGS. 1 and 2, throttle pedal 148 is depressed and throttle pedal switch contact 140 is in the closed position touching lower contact 144.

In one embodiment, park brake switch 106 may be a normally open switch actuated by engagement of park brake control 146. Park brake switch contact 148 may be connected to lower contact 144 of the throttle pedal switch. In FIG. 3, park brake control 146 is disengaged and park brake switch contact 148 is in the normally open position touching upper contact 150. In FIGS. 1 and 2, park brake control 146 is engaged and park brake switch contact 148 is in the closed position touching lower contact 152.

In one embodiment, magneto ignition circuit 107 includes rotating magnet 157 on a flywheel of an internal combustion engine (not shown), primary coil 158, and secondary or high voltage coil 160 that provides power to one or more spark plugs 166. The magneto ignition circuit may be connected between lower contact 152 of the park brake switch, and spark plug 166 to ground 170. Primary coil 158 may be connected between the emitter and collector of transistor 156, and secondary or high voltage coil 160 may be connected between spark plug 166 and ground 168. Trigger or ignition coil 154 may be connected between the lower contact of the park brake switch and base of transistor 156 through diode 164, and to emitter of transistor 156. Resistor 162 may be connected between the base of transistor 156 and primary coil 158.

In FIG. 1, neutral switch 101 is open, throttle pedal switch 104 is closed, and park brake switch 106 is closed. Interlock circuit 100 provides a ground to magneto ignition circuit 107, interrupting power to spark plug 166. The magneto ignition circuit may resume providing power to spark plug 166 so that the engine may recover if, while the flywheel continues turning, the operator shifts into neutral to close neutral switch 101, releases throttle pedal 138 to open throttle pedal switch 104, or disengages park brake 146 to open park brake switch 106. The time for engine recovery is typically about 0.9 seconds after spark interruption.

In FIG. 2, neutral switch 101 is closed, throttle pedal switch 104 is closed, and park brake switch 106 is closed. While the transmission is in neutral, interlock circuit 100 does not ground magneto ignition circuit 107 which continues providing power to spark plug 166. Thus, if the transmission is in neutral, the interlock circuit allows the magneto to provide ignition to the engine regardless of the position of the throttle pedal switch and park brake switch.

In FIG. 3, neutral switch 101 is open, throttle pedal switch 104 is open, and park brake switch 106 is open. If the operator releases throttle pedal 138 while the park brake is engaged, interlock circuit 100 does not ground magneto ignition circuit 107 and may continue providing power to spark plug 166.

Having described a preferred embodiment, it will become apparent that various modifications can be made without departing from the scope of the invention as defined in the accompanying claims.

The invention claimed is:

1. An interlock circuit for a utility vehicle park brake, comprising:

a normally open neutral switch moving to a closed position if a transmission of the utility vehicle is in neutral;

a park brake interlock relay connected to the neutral switch and moving to a closed position if the neutral switch is open;

a normally open throttle pedal switch connected to the park brake interlock relay and moving to a closed position if a throttle pedal is depressed;

a normally open park brake switch connected to the throttle pedal switch and moving to a closed position if the park brake is engaged; and the park brake switch connected to an ignition circuit that provides a high voltage to a spark plug unless the ignition circuit is grounded because the park brake switch, the throttle pedal switch and the park brake interlock relay are all closed.

2. The interlock circuit of claim 1 wherein the ignition circuit includes a transistor connected to a primary coil.

3. The interlock circuit of claim 1 wherein the ignition circuit provides the high voltage to the spark plug if at least one of the park brake switch, the throttle pedal switch and the park brake interlock relay are open within a pre-specified time after being closed.

4. An interlock circuit for a utility vehicle park brake, comprising:

a park brake switch connected to a throttle pedal switch connected to a park brake interlock relay; the park brake switch, throttle pedal switch and park brake interlock relay grounding a magneto ignition circuit if the relay and switches are all closed; the interlock relay being closed by placing a transmission in neutral.

5. The interlock circuit of claim 4 further comprising a normally open neutral switch connected to the interlock relay.

6. An interlock circuit for a utility vehicle park brake, comprising:

a relay connected to a neutral switch on a transmission; the relay actuated by electric current to move a contact to a closed position if the neutral switch is out of neutral;

a throttle pedal switch connected to the relay and moving a contact to a closed position if the throttle pedal is depressed;

a park brake switch connected to the throttle pedal switch and moving a contact to a closed position if the park brake is engaged;

the closing of all of the contacts grounding an ignition circuit.

7. The interlock circuit of claim 6 wherein the ignition circuit is a magneto ignition circuit.

8. The interlock circuit of claim 6 wherein the throttle pedal switch and park brake switch are biased to an open position.

* * * * *